H. G. GREENE AND F. E. ADAMS.
TRAP.
APPLICATION FILED NOV. 1, 1917.
1,307,582.
Patented June 24, 1919.
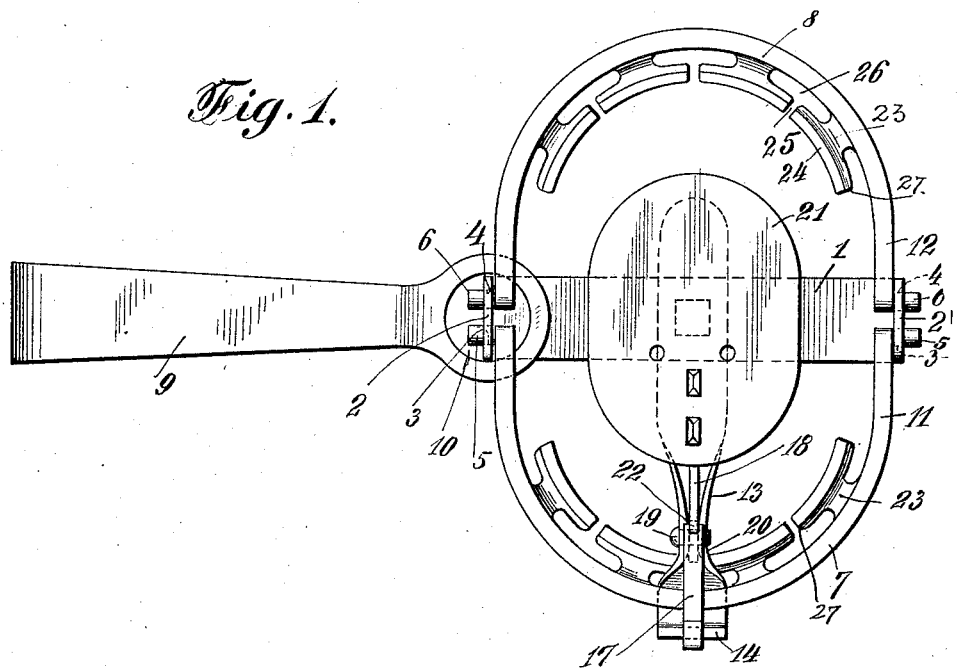
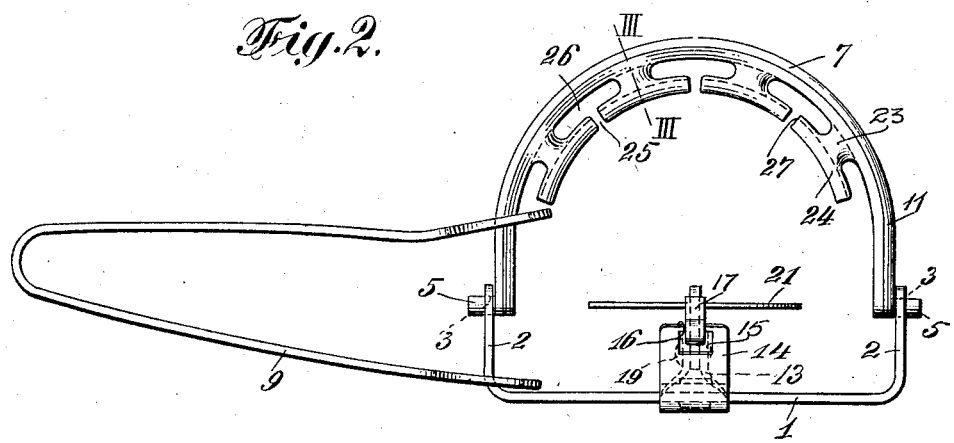
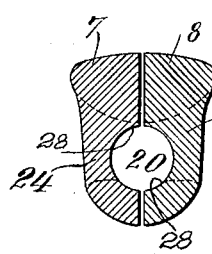
INVENTORS

UNITED STATES PATENT OFFICE.

HOLDRIDGE G. GREENE AND FRANCIS E. ADAMS, OF ONEIDA, NEW YORK, ASSIGNORS TO TRIUMPH TRAP CO., INC., OF ONEIDA, NEW YORK, A CORPORATION OF NEW YORK.

TRAP.

1,307,582.   Specification of Letters Patent.   Patented June 24, 1919.

Application filed November 1, 1917. Serial No. 199,795.

*To all whom it may concern:*

Be it known that we, HOLDRIDGE G. GREENE and FRANCIS E. ADAMS, both residing at Oneida, in the county of Madison and State of New York, have invented certain new and useful Improvements in Traps, of which the following is a specification.

This invention relates to animal traps of the spring operated jaw type, and one of the objects of the invention is to provide a new and improved jaw construction whereby any chance of an animal escaping when its leg, foot, or any other part of its body is caught, is eliminated.

Another object of the invention is to provide jaw construction in a trap of the above type, wherein it is impossible for an animal whose leg has been caught between the jaws to escape by pulling its leg from between the jaws, or by sliding its leg lengthwise of the jaws, and thereby work it out of the trap.

Another object of the invention is to provide jaw construction in a trap of the above type which will afford a better and tighter hold or grip upon an animal's leg than it has obtained in traps of this or similar types as hitherto constructed.

Other objects and aims of the invention, more or less specific than those referred to above, will be in part obvious and in part pointed out in the course of the following description of the elements, combinations, arrangements of parts and applications of principles, constituting the invention; and the scope of protection contemplated will be indicated in the appended claims.

In the accompanying drawings wherein is illustrated a preferred embodiment of our invention:

Figure 1 is a top plan view of the trap showing the jaws in "set" position.

Fig. 2 is a side elevational view of the trap with the jaws in closed position; and Fig. 3 is a vertical sectional view taken on line III—III of Fig. 2.

Referring now to the drawings, wherein similar reference characters refer to similar parts throughout the several views thereof, the reference numeral 1 denotes the base plate of the trap, which is provided with the upstanding ears or flanges 2, which are apertured as at 3 and 4 to provide bearings for the pintles 5 and 6 of the jaws 7 and 8 respectively, said jaws being pivoted to the apertured ears of the base plate in the manner usual in traps of this construction.

Reference numeral 9 indicates the usual U-shaped spring, one leg of which is apertured as at 10 to receive the ear 2 of the base plate, said end bearing upon the base plate as shown. The other leg of the spring is also apertured to receive the arms 11 and 12, which form a part of the jaws 7 and 8 respectively.

13 indicates a cross arm which is secured to the base plate 1, the outer end of which is upturned as at 14 and cut away as at 15 to provide a bearing 16 for a detent 17. An arm 18 pivoted at 19 to upstanding parts 20 of the cross arm carries the platform or pan 21 and the arm 18 is provided with the catch 22, which coöperates with the end of the detent 17 to hold the trap in "set" position.

The above description applies to a trap of well known construction, and the trap is set in the usual way by compressing the spring 9 which allows the jaws 7 and 8 to swing to their open positions, whereupon the detent 17 is passed over the jaw 7 and its end engaged with the catch 22 of the arm 18. Compression on the pan or platform 21 will release the detent from the catch and spring the trap.

Referring now to the subject of the present invention, each of the jaws 7 and 8 is provided with a plurality of inwardly extending posts 23, and each of these posts is provided with segmentally formed gripping members 24. The posts 23 converge laterally, the relation of the parts being such that when the jaws 7 and 8 are in closed position the segmentally formed gripping members 24 of the oppositely disposed jaws have their faces lying in engagement. In other words, the faces of the segmentally formed members 24 and the gripping faces of the jaws proper, lie in the same plane. The gripping members 24 of each jaw are spaced apart, as shown, thus providing the spaces 25 between neighboring members and the posts 23 being of contracted formation, there is provided the spaces 26 between them. The edges of the ends 27 of the gripping members are made relatively sharp, as shown, for a purpose which will be presently apparent.

It will also be noted that the inner surfaces of the posts 23 are hollowed out, as shown at 28, so that the inner surfaces of the opposed posts are separated from each other, whereby there is provided continuous gripping edges on the lower side of the jaws 7 and 8.

In the operation of the trap it will be seen that when the same is sprung by an animal the jaws are moved inwardly under the influence of the spring 9, the jaws 7 and 8, as well as the opposed pair or pairs of the segmentally formed gripping members 24, will engage the leg of said animal and hold it securely at two points against withdrawal. Should the struggle of the animal to release itself from the trap tend to slide the leg lengthwise of the trap and between the jaws, such sliding movement will be prevented by reason of the engagement of the ends 27 of the segmentally formed gripping members therewith. Moreover, the spaces between the gripping members 24 and the spaces 26 afford spaces into which the flesh of the animal readily sinks and swells when the animal is caught. It will, therefore, be seen that an animal caught in a trap of this construction cannot possibly escape. It cannot pull its leg in or out, neither can it move or slide the member engaged by the jaws of the trap sidewise toward the end of the trap opposite the spring where the tension of the spring, due to the decreased leverage, is less than is toward the end engaged by the spring. Moreover, it will be seen that if an animal should gnaw off the leg at a point below the gripping members 24, the jaws 7 and 8 which are inaccessible to the gnawing operation by reason of the presence of the gripping members 24, would still hold the leg and prevent the animal's escape.

As many changes could be made in this construction without departing from the scope of the following claims, it is intended that all matter contained in the above description or shown in the accompanying drawing shall be interpreted as illustrative only and not in a limiting sense.

Having thus described my invention what I claim as new and desire to secure by Letters Patent is:—

1. An animal trap, comprising a base plate, a pair of jaws pivotally mounted thereon, each of said jaws being provided with inwardly extending posts, and elongated gripping members carried upon each of said posts.

2. An animal trap, comprising a base plate and jaws pivoted thereon, each of said jaws having an inwardly extending post, and a gripping member carried by said post, which extends in parallel relation with the jaw and is spaced therefrom.

3. An animal trap, comprising a base plate and pivoted jaws, each jaw being provided with a plurality of inwardly extending posts, and each post being provided with an elongated gripping member which lies in a plane parallel with that of the jaw, said gripping members being spaced from each other and from the jaw.

4. An animal trap, comprising a base plate, jaws pivoted thereon, each jaw being provided with a post extending inwardly therefrom, said post being concave upon its inner surface, a gripping member carried by each end of said post, said gripping member extending in a plane parallel with the jaw upon which it is mounted, and said gripping members having their ends in spaced relation and being spaced from the jaw.

5. An animal trap, comprising a base plate having pivotally mounted jaws, each jaw having inwardly extending posts, elongated gripping members carried upon each of said posts, the gripping members upon the respective jaws lying in opposed positions when the jaws are closed.

In testimony whereof we affix our signatures in the presence of two witnesses.

HOLDRIDGE G. GREENE.
FRANCIS E. ADAMS.

Witnesses:
ALBERT E. KINSLEY,
J. HARRY SCHOCKE.

Copies of this patent may be obtained for five cents each, by addressing the "Commissioner of Patents, Washington, D. C."